United States Patent [19]

Saito et al.

[11] Patent Number: 5,035,948
[45] Date of Patent: Jul. 30, 1991

[54] MAGNETIC RECORDING MEDIUM AND A METHOD FOR PREPARING THE MEDIUM

[75] Inventors: Shinji Saito; Hiroshi Ogawa, both of Kanagawa, Japan

[73] Assignee: Fuji Photo Film Co., Ltd., Kanagawa, Japan

[21] Appl. No.: 576,103

[22] Filed: Aug. 31, 1990

Related U.S. Application Data

[63] Continuation of Ser. No. 259,367, Oct. 18, 1988, abandoned.

[30] Foreign Application Priority Data

Oct. 19, 1987 [JP] Japan ................................. 62-264726

[51] Int. Cl.$^5$ .............................................. G11B 23/00
[52] U.S. Cl. ..................................... 428/329; 427/131; 428/336; 428/694; 428/900
[58] Field of Search ............... 428/336, 694, 900, 329; 427/131

[56] References Cited

U.S. PATENT DOCUMENTS 4,643,941  2/1987  Hiyoshi et al. ..................... 428/900
4,743,500  5/1988  Miyashi et al. ..................... 428/900
4,844,946  7/1989  Komatsu et al. .................... 428/694

Primary Examiner—Paul J. Thibodeau
Attorney, Agent, or Firm—Sughrue, Mion, Zinn Macpeak & Seas

[57] ABSTRACT

A magnetic recording medium is disclosed, comprising a nonmagnetic support having thereon an under magnetic layer and an upper magnetic layer in that order, wherein the thickness of the upper magnetic layer is less than 0.5 $\mu$m and abrasive agents, which have a Mohs' hardness of 6 or more and have an average particle diameter of 0.5 $\mu$m or less, are contained in the upper magnetic layer. And a method for preparing a magnetic recording medium which comprises coating a coating composition for an under magnetic layer on a running non-magnetic support, and successively coating thereon a coating composition for an upper magnetic layer containing abrasive agents, which have a Mohs' hardness of 6 or more and an average particle diameter of 0.5 $\mu$m or less, in a dry thickness of less than 0.5 $\mu$m while the under magnetic layer is wet.

14 Claims, No Drawings

MAGNETIC RECORDING MEDIUM AND A METHOD FOR PREPARING THE MEDIUM

This is a Continuation of Application Ser. No. 07/259,367 filed Oct. 18, 1988, now abandoned.

FIELD OF THE INVENTION

This invention relates to a magnetic recording medium having a nonmagnetic support and a magnetic layer, and more particularly it relates to a magnetic recording medium having at least two magnetic layers and the method for preparing the magnetic recording medium.

BACKGROUND OF THE INVENTION

Magnetic recording media are widely used as audio tapes, video tapes or as floppy disks. A magnetic recording medium is fundamentally composed of a nonmagnetic support having laminated thereon a magnetic layer containing ferromagnetic particles dispersed in a binder.

A magnetic recording medium requires high levels of quality with regard to various characteristics such as electromagnetic characteristics, running durability and running performance. In fact, even higher levels of quality is demanded for reproducing original sounds from an audio tape. Also, there is a high demand for excellent electromagnetic characteristics for reproducing original images for a video tape.

As described above, it is not enough to provide excellent electromagnetic characteristics for a magnetic recording medium; good running durability is also required. And an abrasive agent plays an important role in the achievement of good running durability. That is, abrasive agents contained in a magnetic layer are distributed wholly in the magnetic layer, and a certain concentration of these abrasive agents is also present on the surface of a magnetic layer. When a magnetic recording medium runs, contacting parts of running system such as a head, the abrasive agents present on the surface of the magnetic layer exhibit an abrasive effect at the contact surface between the surface of the magnetic layer and the magnetic head. Accordingly, incorporation of abrasive agents into a magnetic recording medium improves running durability. However, when the abrasive agents present on the surface of the magnetic layer represent only a small percentage of all the abrasive agents added into the magnetic layer, it is difficult to secure sufficiently excellent running durability. For example, when an additive amount of abrasive agents is increased to improve durability, the concentration of ferromagnetic particles decreases, and when abrasive agents having a large particle diameter are used, abrasive agents are likely to excessively extrude from the surface of the magnetic layer. And as a result thereof, the above-described electromagnetic characteristics deteriorate. Such deterioration is a serious problem.

In order to solve the above problem, it was proposed that running durability could be wholly improved by providing two magnetic layers, i.e., an upper magnetic layer and an under magnetic layer, whereby the upper layer is excellent particularly in running durability and the under layer is excellent particularly in electromagnetic characteristics (as described in JP-A-58-200425) (the term "JP-A" as used herein refers to a "published unexamined Japanese patent application"). That is, additives such as abrasive agents are not added into the under layer so that the content of ferromagnetic particles is made high to improve electromagnetic characteristics. At the same time, running durability could be improved without deteriorating electromagnetic characteristics by (1) defining the thickness of the upper layer as from 0.5 to 1.5 $\mu$m, (2) adding abrasive particles into the upper layer only, and (3) using abrasive agents having a maximum particle diameter not exceeding the thickness of the upper layer.

Thus, a magnetic recording medium having the simultaneous advantage of good electromagnetic characteristics and good running durability could be obtained to some extent by providing two magnetic layers. However, it cannot be said that the above simultaneous advantage is completely excellent. In particular, the quality of running durability may suffer.

SUMMARY OF THE INVENTION

An object of this invention is to provide a magnetic recording medium such as an audio tape or a video tape having improved electromagnetic characteristics and running durability and a method for preparing the same.

To attain this object, the present invention provides a magnetic recording medium comprising a nonmagnetic support having thereon an under magnetic layer and an upper magnetic layer in that order, wherein the thickness of said upper magnetic layer is less than 0.5 $\mu$m and abrasive agents, which have a Mohs' hardness of 6 or more and have an average particle diameter of 0.5 $\mu$m or less, are contained in said upper magnetic layer.

The above magnetic recording medium can effectively be prepared using a method for preparing a magnetic recording medium which comprises coating a coating composition for an under magnetic layer on a running nonmagnetic support, and successively coating thereon a coating composition for an upper magnetic layer containing abrasive agents, which have a Mohs' hardness of 6 or more and an average particle diameter of 0.5 $\mu$m or less, in a dry thickness of less than 0.5 $\mu$m while the under magnetic layer is wet.

The magnetic recording medium of this invention has at least two magnetic layers, as described above, and the upper magnetic layer has a thickness of less than 0.5 $\mu$m and abrasive agents contained in the upper magnetic layer have a Mohs' hardness of 6 or more and an average particle diameter of 0.5 $\mu$m or less.

Thus, it has become possible to exhibit excellent abrasive effects by (1) making an upper magnetic layer very thin, i.e., a thickness of less than 0.5 $\mu$m, and (2) incorporating into the upper magnetic layer abrasive agents having a very small average particle diameter of 0.5 $\mu$m or less. A magnetic recording medium so constructed provides sufficient abrasive effects for the improvement of running durability, yet since the abrasive agents do not extrude excessively on the surface of the magnetic layer, the electromagnetic characteristics of the medium are not deteriorated.

Even though the upper magnetic layer is extremely thin (less than 0.5 $\mu$m), the magnetic layer can still have uniform thickness and an extremely smooth surface when prepared in accordance with the present invention's method for preparing a magnetic recording medium.

DETAILED DESCRIPTION OF THE INVENTION

A magnetic recording medium of this invention is fundamentally composed of a nonmagnetic support and at least two magnetic layers containing ferromagnetic particles dispersed in a binder.

The nonmagnetic supports for use in this invention include films or sheets of polyesters such as polyethylene terephthalate (PET), or polyethylene naphthalate, polyolefins such as polypropylene; cellulose derivatives such as cellulose triacetate or cellulose diacetate, vinyl type resins such as polyvinyl chloride or polyvinylidene chloride, synthetic resins such as polycarbonate, polyamide, polyamide imide or polyimide; foils of nonmagnetic metal such as aluminum or copper; foils of metals such as a stainless steel; paper; and ceramic sheets.

These supports have a thickness of generally from 2.5 to 100 $\mu$m and preferably from 3 to 80 $\mu$m.

Various studies have been made by the present inventors to improve the running durability of a magnetic recording medium. As described above, it has been found that when the amount of abrasive agents to be added is increased to improve running durability, the content of ferromagnetic particles is decreased, and when abrasive agents having a large particle diameter are used, abrasive agents are likely to extrude from the surface of the magnetic layer. Therefore, even though running durability is improved, electromagnetic characteristics are deteriorated.

On the other hand, running durability can be improved without deteriorating the above-described electromagnetic characteristics in accordance with this invention. That is an inventive feature of this invention resides in its provision of at least two magnetic layers on a nonmagnetic support, an under magnetic layer and an upper magnetic layer in that order, wherein the upper layer has a thickness of less than 0.5 $\mu$m and preferably from 0.3 to 0.05 $\mu$m, and abrasive agents contained in the upper magnetic layer have a Mohs' hardness of 6 or more and preferably from 8 to 10, and an average particle diameter of 0.5 $\mu$m or less and preferably from 0.2 to 0.05 $\mu$m. Thus, it is possible to achieve excellent abrasive effects by (1) making an upper magnetic layer very thin, i.e., a thickness of less than 0.5 $\mu$m, and (2) incorporating into the upper magnetic layer abrasive agents having such a very small average particle diameter of 0.5 $\mu$m or less. Despite the small particle diameter of the abrasive agents, the thin upper layer still permits these abrasive agents to properly extrude from the surface of the magnetic layer sufficiently to maintain good running durability. Preferably, the abrasive agents have an average particle diameter of half or less than half, particularly one third or less than one third, of the thickness of the upper magnetic layer in order to achieve even better electromagnetic characteristics. However, when abrasive agents having a Mohs' hardness of 6 or more have an average particle diameter of less than one tenth of the thickness of the upper magnetic layer, abrasive effects are insufficient. Therefore, the abrasive agents of the present invention preferably have an average particle diameter of one tenth or more of the thickness of the upper magnetic layer.

In the present invention, excellent electromagnetic characteristics and good running durabilities can be obtained because the abrasive agents still can properly extrude on the surface of the magnetic layer due to a small average particle diameter of the abrasive agents, assuming a proper amount of abrasive agents is added.

To obtain the thin upper magnetic layer having a thickness of less than 0.5 $\mu$m of the present invention, it is necessary to provide a manufacturing process which comprises coating a coating composition for an under magnetic layer, and successively coating a coating composition for an upper magnetic layer, while the under magnetic layer is wet. In accordance with the above process, it is possible to obtain a thin and uniform upper magnetic layer having a thickness of less than 0.5 $\mu$m.

Also, the under magnetic layer has preferably a thickness of from 0.5 to 8 $\mu$m and particularly from 1 to 5 $\mu$m.

With a view towards maintaining good running durability, it is preferable that the abrasive agents contained in the upper magnetic layer have a Mohs' hardness of 6 or more and are contained in the magnetic layer in an amount of preferably from 2 to 15 parts by weight and particularly from 4 to 10 parts by weight per 100 parts by weight of ferromagnetic particles. The abrasive agents having Mohs' hardness of 6 or more include-$\alpha$-Al$_2$O$_3$ (Mohs' hardness: 9), TiO$_2$ (Mohs' hardness: 6.5), SiO$_2$ (Mohs' hardness: 7), SnO$_2$ (Mohs' hardness: 6.5), Cr$_2$O$_3$ (Mohs' hardness: 9), SiC (Mohs' hardness 9) and TiC (Mohs' hardness: 9). Among these, $\alpha$-Al$_2$O$_3$ and Cr$_2$O$_3$ are preferred.

In the magnetic recording medium of the present invention, it is preferable that the amount of abrasive agents contained in the under magnetic layer is less than that contained in the upper magnetic layer in order to obtain excellent electromagnetic characteristics. It is still more preferable that the under magnetic layer does not contain abrasive agents at all because the upper magnetic layer of the present invention is prepared in such a way so as to provide sufficient running durability for the magnetic recording medium.

The resins for use as binders in forming a magnetic layer of the present invention are not particularly limited. The resins which are preferably used in the present invention have a number average molecular weight of preferably from 1,000 to 200,000 and more preferably from 10,000 to 100,000. Such binder resins include vinyl chloride type copolymers (e.g., vinyl chloride/vinyl acetate copolymer, vinyl chloride/vinyl acetate/vinyl alcohol copolymer, vinyl chloride/vinyl acetate/acrylic acid copolymer, vinyl chloride/vinylidene chloride copolymer, vinyl chloride/acrylonitrile copolymer, ethylene/vinyl acetate copolymer); cellulose derivatives such as nitrocellulose resins; acrylic resins; polyvinyl acetal resins; polyvinyl butyral resins; epoxy resins; phenoxy resins; and polyurethane type resins (e.g., polyester type polyurethane resins, polyether type polyurethane resins, polycarbonate polyurethane resins). Furthermore, polar groups such as a hydroxyl group, a carboxylic group, an epoxy group, a metal sulfonate group, a phosphoric acid group or a phosphate group may be contained in these resins. The amount of the polar groups contained in these resins is preferably from $1 \times 10^{-2}$ to $1 \times 10^{-6}$ mol per gram of the resin.

The above-mentioned resins may be used alone or in combination.

The amount of the resins which can be used in the present invention is preferably from 5 to 50 parts by weight and more preferably from 10 to 30 parts by weight, per 100 parts by weight of the ferromagnetic particles.

When a hardening agent is used, polyisocyanate compounds are generally the agent of choice. The polyisocyanate compounds are generally selected from those that are used as components of hardening agents such as polyurethane type resins. The examples of polyisocyanate compounds include a reaction product of tolylene diisocyanate and 1 mol of trimethylolpropane (e.g., "Desmodule L-75", made by Bayer Co., Ltd.); a reaction product of 3 mols of diisocyanate such as xylylene diisocyanate or hexamethylene diisocyanate and 1 mol of trimethylolpropane; a buiret adduct of 3 mols of hexamethylene diisocyanate; isocyanurate compound of 5 mols of tolylene diisocyanate; an isocyanurate adduct of 3 mols of tolylene diisocyanate and 2 mols of hexamethylene diisocyanate; and polymer of isophorone diisocyanate and diphenylmethane diisocyanate.

When a hardening treatment is conducted by electron beam radiation, a compound having reactive double bonds (e.g., urethane acrylate) as described in JP-A-59-58623 and JP-A-59-71130 can be preferably used.

The total weight amount of resin components and hardening agents is preferably from 5 to 40 parts by weight, and more preferably from 10 to 20 parts by weight, per 100 parts by weight of ferromagnetic particles.

The examples of ferromagnetic particles for use in this invention include metal oxide type ferromagnetic particles such as $\gamma\text{-}Fe_2O_3$, ferromagnetic particles containing different metals, metal oxides such as $\gamma\text{-}Fe_2O_3$ containing other components such as cobalt, and ferromagnetic metal particles containing ferromagnetic metals such as iron, cobalt or nickel.

When ferromagnetic metal particles are used, ferromagnetic metal particles containing iron, cobalt or nickel and having a specific surface area ($S_{BET}$ method) of 42 $m^2/g$ or more and particularly preferably 45 $m^2/g$ or more, are preferred.

The examples of ferromagnetic metal particles include ferromagnetic metal particles having a metal content of 75 wt % or more and 80 wt % or more of the metal content being at least a kind of ferromagnetic metal or alloy (e.g., Fe, Co, Ni, Fe-Co, Fe-Ni, Co-Ni, Co-Ni-Fe) and alloys having another components in an amount of 20 wt % or less of the metal content (e.g., Al, Si, S, Sc, Ti, V, Cr, Mn, Cu, Zn, Y, Mo, Rh, Pd, Ag, Sn, Sb, B, Ba, Ta, W, Re, Au, Hg, Pb, P, La, Ce, Pr, Nd, Te, Bi). The above ferromagnetic metals may contain a slight amount of water, hydroxides or oxides.

The method for preparing these ferromagnetic particles is conventional, and ferromagnetic particles used in this invention can be prepared by a conventional method (for example, the method as described in *Chemistry and Industry of Magnetic Substance*, Tekumato K.K.).

The shapes of ferromagnetic particles are not particularly limited, and may be generally acicular, granular, dice-like, ellipsoidal and tabular. The acicular ferromagnetic particles are particularly preferred. The acicular ferromagnetic particles have an acicular ratio (long axis/short axis) of preferably from 3 to 20 and particularly preferably from 4 to 7.

The above-described resin component, hardening agents and ferromagnetic particles are mixed, kneaded and dispersed with a solvent generally used for preparing a magnetic coating composition (e.g., methyl ethyl ketone, dioxane, cyclohexane, ethyl acetate) to prepare a magnetic coating composition. Mixing, kneading and dispersing can be done in a conventional manner.

It is needless to say that conventionally used additives such as antistatic agents (e.g., carbon black), lubricating agents (e.g., fatty acid, fatty acid ester, silicon oil) or dispersing agents or filling agents may be included in the magnetic coating composition in addition to the above-described components.

A method for preparing a magnetic recording medium of this invention will be hereinafter illustrated. As described above, the thus-prepared magnetic composition is coated on a nonmagnetic support in the following manner. At first, a magnetic coating composition for an under magnetic layer is prepared by mixing, kneading and dispersing the usual components for forming a magnetic layer. Such components usually include resin components, ferromagnetic particles, and optionally mixed hardening agents with a solvent. Then, in similar fashion, a magnetic coating composition for an upper magnetic layer is prepared by adding abrasive agents, which have a Mohs' hardness of 6 or more and an average particle diameter of 0.5 $\mu$m or less, to the above-mentioned usual components for forming a magnetic layer.

The characteristic feature of the present invention's method for preparing a magnetic recording medium resides in coating a coating composition for an under magnetic layer on a running nonmagnetic support, and while the coated under layer is wet, successively coating thereon a coating composition for an upper magnetic layer so that the dry thickness of the upper magnetic layer is less than 0.5 $\mu$m. That is, this method is referred to as a wet-on-wet coating method. When a reverse roller is, for example, used for continuously coating two layers, reverse rollers are successively installed so that the nonmagnetic support may be put therebetween, or two reverse rollers are installed at a certain distance to such an extent that an upper layer can be coated while an under layer is wet (that is, the under-coated layer is adhesive because it still includes a solvent).

As described above, it is necessary that the upper magnetic layer of the present invention has a thickness of less than 0.5 $\mu$m. Generally, when two magnetic layers are provided, a coating composition for an under magnetic layer is coated, and after it is dried, an upper magnetic layer is formed thereon by coating a composition for the upper magnetic layer. However, when an upper magnetic layer is provided after an under magnetic layer is dried, it is difficult and indeed rather impossible to obtain such a thin (less than 0.5 $\mu$m) and uniform upper layer. Therefore, it is necessary that after a coating composition for an under magnetic layer is coated, and while that coated layer is wet, a coating composition for an upper magnetic layer is successively coated thereon to form a magnetic layer. And as a result thereof, a uniform thin upper magnetic layer having a thickness of less than 0.5 $\mu$m can be obtained.

The magnetic layer thus-prepared in accordance with the above method is an extremely thin layer having a thickness of less than 0.5 $\mu$m. Furthermore, this layer is uniform and has an extremely smooth surface. In accordance with the above method, a magnetic recording medium having excellent running durability without deteriorating electromagnetic characteristics can be obtained.

The magnetic coating composition is coated so that the thickness of the magnetic layer (total thickness of the under and upper magnetic layers) is generally from 0.5 to 10 $\mu$m and preferably from 2 to 6 $\mu$m.

A backing layer may be provided on the surface of a nonmagnetic support which is opposite to the surface coated with a magnetic coating composition. Such a backing layer is provided by coating onto said nonmagnetic support's opposite surface a coating composition for a backing layer. This composition comprises particle components such as abrasive agents, or antistatic agents and binders dispersed in an organic solvent. The method for preparing the backing layer used in the present invention is described in U.S. Pat. No. 4,567,063.

An adhesive layer may be provided on the surface of the nonmagnetic support to be coated with a magnetic coating composition, and an adhesive layer may also be provided on the surface to be coated with a coating composition for a backing layer.

Generally, a layer coated with a magnetic coating composition is subjected to the magnetic orientation to orientate ferromagnetic particles contained in the magnetic layer, and then the layer is dried.

After the coated layer is dried, it generally is subjected to the surface smoothing treatment. Surface smoothing treatment is conducted, for example, by a supercalender roll. The pores generated by removing the solvent upon drying disappear, and the packing density of ferromagnetic particles in the magnetic layer increases, whereby a magnetic recording medium having high electromagnetic characteristics can be obtained.

The laminated layer is then hardened and slit to a desired shape.

Cutting can be done under conventional conditions and in a conventional manner by a general cutting device such as a slitter or a cutting device.

A magnetic recording medium of this invention having two magnetic layers has been described hereinbefore, and as long as two magnetic layers having the above-described properties are provided, the total number of magnetic layers may be three or more.

This invention will be illustrated in more detail by the following examples and comparative examples. However, the present invention is not to be construed as being limited to these examples. In the following examples and comparative examples, all parts are by weight, unless otherwise mentioned.

EXAMPLE 1

Coating Composition for the Under Magnetic Layer

| | |
|---|---|
| Co-γ-Fe$_2$O$_3$ (Hc: 650 Oe, S$_{BET}$ specific surface area: 35 m$^2$/g) | 100 parts |
| Copolymer of Vinyl Chloride/Vinyl Acetate/ Maleic Anhydrid (composition ratio: 86/13/1, degree of polymerization: 400) | 12 parts |
| Polyester Polyurethane Resin | 6 parts |
| Carbon Black(average particle diameter: 20 mμ) | 3 parts |
| Butyl Stearate | 1 part |
| Stearic Acid | 2 parts |
| Butyl Acetate | 200 parts |

Coating Composition for the Upper Magnetic Layer

| | |
|---|---|
| Co-γ-Fe$_2$O$_3$ (Hc: 700 Oe, S$_{BET}$ specific surface area: 45 m$^2$/g) | 100 parts |
| Copolymer of Vinyl Chloride/Vinyl Acetate/ Maleic Anhydride (composition ratio: 86/13/1, degree of polymerization: 400) | 12 parts |
| Polyester Polyurethane Resin | 6 parts |
| α-Al$_2$O$_3$ (average particle diameter: 0.2 μm) | 10 parts |
| Carbon Black(average particle diameter: 90 mμ) | 3 parts |
| Butyl Stearate | 1 part |
| Stearic Acid | 2 parts |
| Butyl Acetate | 200 parts |

Each composition was mixed, kneaded and mixed using a sand mill. 6 Parts of polyisocyanate and 40 parts of butyl acetate were added respectively to the thus-obtained dispersions for the under and upper magnetic layers and then each dispersion was filtrated using a filter having an average pore diameter of 1 μm to obtain coating compositions for the under and for the upper magnetic layers.

The thus-obtained coating composition for the under magnetic layer was coated using a reverse roll on the surface of a polyethylene terephthalate support having 15 μm thickness at a running rate of 60 m/min. to obtain the under magnetic layer having a dry thickness of 3.0 μm, and immediately after, while the under magnetic layer was wet, a coating composition for the upper magnetic layer was coated thereon using a reverse roll to obtain the upper magnetic layer having a dry thickness of 0.45 μm, and while the magnetic layers were wet, they were subjected to orientation using the magnets having a magnetic force of 3,000 gauss, dried, subjected to the calendering treatment and then slit to a 1/2 inch width to prepare a video tape.

EXAMPLE 2

A video tape was prepared in the same manner as in Example 1 except that β-Al$_2$O$_3$ having an average particle diameter of 0.2 μm, which was used in the coating composition for the upper magnetic layer in Example 1, was changed to α-Al$_2$O$_3$ having an average particle diameter of 0.1 μm.

EXAMPLE 3

A video tape was prepared in the same manner as in Example 2 except that the thickness of the upper magnetic layer was 0.25 μm instead of 0.45 μm.

EXAMPLE 4

A video tape was prepared in the same manner as in Example 1 except that 5 parts of α-Al$_2$O$_3$ having an average particle diameter of 0.2 μm in the coating composition for the upper magnetic layer in Example 1 was used instead of 10 parts thereof.

EXAMPLE 5

A video tape was prepared in the same manner as in Example 1 except that Cr$_2$O$_3$ having an average particle diameter of 0.2 μm was used instead of α-Al$_2$O$_3$ having an average particle diameter of 0.2 μm in the coating composition for the upper magnetic layer in Example 1.

EXAMPLE 6

A video tape was prepared in the same manner as in Example 5 except that Cr$_2$O$_3$ having an average particle diameter of 0.1 μm was used instead of Cr$_2$O$_3$ having an average particle diameter of 0.2 μm in the coating composition for the upper magnetic layer in Example 5.

COMPARATIVE EXAMPLE 1

A video tape was prepared in the same manner as in Example 1 except that the thickness of the upper magnetic layer was 1.0 μm instead of 0.45 μm in Example 1.

COMPARATIVE EXAMPLE 2

A video tape was prepared in the same manner as in Example 2 except that the thickness of the upper magnetic layer was 1.0 μm instead of 0.45 μm in Example 2.

Regarding video tapes obtained in examples and comparative examples, Table 1 below shows (I) the kind of abrasive agent used, (II) the average particle diameter of the abrasive agent used, (III) the added amounts of the abrasive agents used in the upper magnetic layer, (IV) the thickness of the upper layer, and (V) the physical properties of each tape evaluated in the following manner.

Measuring Method (V) Y·S/N(Signal to Noise Ratio of Brilliance Signal of Video)

S/N of luminance signals at 4 MHz was measured when the output level of the video tape obtained in Comparative Example 1 was assumed to be 0 dB.

(VI) Still Life

Signals of each video tape were reproduced on a still mode, and the period of time for S/N on a screen to decrease by 6 dB was measured. The output level was measured using NV-870 HD type output level measuring device manufactured by Matsushita Electric Industrial Co., Ltd.

TABLE 1

| Example No. | (I) Abrasive Agent (kind) | (II) Average Particle Diameter (abrasive agent) (μm) | (III) Amount of Abrasive Agent Used (part) | (IV) Upper Layer Thickness (μm) | (V) Y·S/N (dB) | (VI) Still Life (min.) |
|---|---|---|---|---|---|---|
| Example 1 | A | 0.2 | 10 | 0.45 | 0.0 | 120 or more |
| Example 2 | A | 0.1 | 10 | 0.45 | 0.1 | 100 |
| Example 3 | A | 0.1 | 10 | 0.25 | 0.1 | 110 |
| Example 4 | A | 0.2 | 5 | 0.45 | 0.0 | 90 |
| Example 5 | B | 0.2 | 10 | 0.45 | 0.2 | 120 or more |
| Example 6 | B | 0.1 | 10 | 0.45 | 0.3 | 120 or more |
| Comparative Example 1 | A | 0.2 | 10 | 1.0 | 0.0 | 50 |
| Comparative Example 2 | A | 0.1 | 10 | 1.0 | 0.0 | 20 |

In column (I) "abrasive agent", A means α-$Al_2O_3$ and B means $Cr_2O_3$.

It is clearly seen from the results of Table 1 that a video tape having an upper magnetic layer with abrasive agents of an average particle diameter of 0.5 μm or less and with a thickness of less than 0.5 μm has a long still life yet and exhibits no decrease of Y·S/N. Accordingly, such a video tape can be said to be a magnetic recording medium having improved running durability without deteriorating electromagnetic characteristics.

On the other hand, video tapes having a thick upper magnetic layer (obtained in Comparative Examples 1 and 2) have a much shorter still life (less than half that of Examples 1 to 6). Such a short still life demonstrates that the running durability of Comparative Examples 1 and 2 is not sufficient.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support having thereon an under magnetic layer and an upper magnetic layer in that order, each comprising ferromagnetic particles and binders, wherein the thickness of said upper magnetic layer is less than 0.5 μm and abrasive agents, which have a Mohs' hardness of 6 or more and have an average particle diameter of 0.5 μm or less, are contained in said upper magnetic layer wherein said ferromagnetic particles contained in the under magnetic layer and the upper magnetic layer are acicular ferromagnetic particles having an acicular ratio (long axis/short axis) of from 3 to 20 and wherein said ferromagnetic particles are metal oxide ferromagnetic particles or ferromagnetic metal particles.

2. The magnetic recording medium as in claim 1, wherein the abrasive agents contained in the upper magnetic layer have an average particle diameter of half or less than half of the thickness of the upper magnetic layer.

3. The magnetic recording medium as in claim 1, wherein the abrasive agents contained in the upper magnetic layer have an average particle diameter of one tenth or more of the thickness of the upper magnetic layer.

4. The magnetic recording medium as in claim 1, wherein ferromagnetic particles are contained in the upper magnetic layer, and the content of the abrasive agents contained in the upper magnetic layer is from 2 to 15 parts by weight per 100 parts by weight of the ferromagnetic particles contained in the upper magnetic layer.

5. The magnetic recording medium as in claim 1, wherein the under magnetic layer does not contain abrasive agents at all.

6. The magnetic recording medium as in claim 1, wherein the abrasive agents are α-$Al_2O_3$ or $Cr_2O_3$.

7. The magnetic recording medium as in claim 1, wherein the abrasive agents have an average particle diameter of from 0.05 to 0.2 μm.

8. The magnetic recording medium as in claim 1, wherein the thickness of said upper magnetic layer is from 0.05 to 0.3 μm.

9. A method for preparing a magnetic recording medium which comprises a coating a coating composition for an under magnetic layer on a running non-magnetic support, and successively coating thereon a coating composition for an upper magnetic layer containing abrasive agents, which have a Mohs' hardness of 6 or more and an average particle diameter of 0.5 μm or less, in a dry thickness of less than 0.5 μm while the under magnetic layer is wet, each of said magnetic layers comprising ferromagnetic particles and binder, wherein said ferromagnetic particles contained in the under magnetic layer and the upper magnetic layer are acicular ferromagnetic particles having an acicular ratio (long axis/short axis) of from 3 to 20 and wherein said ferromagnetic particles are metal oxide ferromagnetic particles or ferromagnetic metal particles.

10. The method for preparing a magnetic recording medium as in claim 9, wherein the abrasive agents contained in the upper magnetic layer have an average particle diameter of half or less than half of the thickness of the upper magnetic layer.

11. The method for preparing a magnetic recording medium as in claim 9, wherein the abrasive agents contained in the upper magnetic layer have an average particle diameter of one tenth or more of the thickness of the upper magnetic layer.

12. The method for preparing a magnetic recording medium as in claim 9, wherein ferromagnetic particles are contained in the upper magnetic layer, and the content of the abrasive agents contained in the upper magnetic layer is from 2 to 15 parts by weight per 100 parts by weight of the ferromagnetic particles contained in the upper magnetic layer.

13. The method for preparing a magnetic recording medium as in claim 9, wherein the under magnetic layer does not contain abrasive agents at all.

14. The method for preparing a magnetic recording medium as in claim 9, wherein the abrasive agents have an average particle diameter of from 0.05 to 0.2 μm, the thickness of said upper magnetic layer is from 0.05 to 0.3 μm, and the abrasive agents contained in the upper magnetic layer have an average particle diameter of half or less than half of the thickness of the upper magnetic layer.

* * * * *